(12) United States Patent
Diaz et al.

(10) Patent No.: US 7,188,278 B1
(45) Date of Patent: Mar. 6, 2007

(54) METHOD, SYSTEM, AND APPARATUS FOR UTILIZING COMPRESSED PROGRAM CODE IN THE BOOT BLOCK PORTION OF A COMPUTER BIOS

(75) Inventors: Juan Diaz, Round Rock, TX (US); Anand Joshi, Austin, TX (US)

(73) Assignee: American Megatrends, Inc., Norcross, GA (US)

( * ) Notice: Subject to any disclaimer, the term of this patent is extended or adjusted under 35 U.S.C. 154(b) by 519 days.

(21) Appl. No.: 10/671,079

(22) Filed: Sep. 25, 2003

Related U.S. Application Data

(60) Provisional application No. 60/447,085, filed on Feb. 13, 2003.

(51) Int. Cl.
*G06F 11/00* (2006.01)

(52) U.S. Cl. ............................................. 714/36; 713/2

(58) Field of Classification Search .................. 714/36, 714/6; 713/2
See application file for complete search history.

(56) References Cited

U.S. PATENT DOCUMENTS 6,018,806 A * 1/2000 Cortopassi et al. ............ 714/8

2003/0126511 A1 * 7/2003 Yang et al. .................... 714/39

OTHER PUBLICATIONS

Null, Linda. "The Essentials of Computer Orginzation and Architecture." Copyright 2003. Jones and Barlett Publishing, pp. 233-235.*

* cited by examiner

*Primary Examiner*—Robert Beausoliel
*Assistant Examiner*—Matthew Urick
(74) *Attorney, Agent, or Firm*—Hope Baldauff Hartman, LLC

(57) ABSTRACT

A computer program product is provided that is readable by a computing system and encoding a computer program of instructions. The computer program product includes a hardware protected region that is utilized to store a portion of a computer BIOS. The BIOS includes a compressed computer program for restoring at least a portion of the computer BIOS when uncompressed and executed. The computer program product also includes a non-hardware protected region that is utilized to store the remainder of the computer BIOS. The hardware protected region may include an uncompressed computer program that may be utilized to uncompress the compressed program. The hardware protected region may also include an uncompressed program for detecting and initializing one or more memory devices within the computer system. Methods and apparatus are also provided for creating and utilizing the contents of the computer program product.

20 Claims, 10 Drawing Sheets

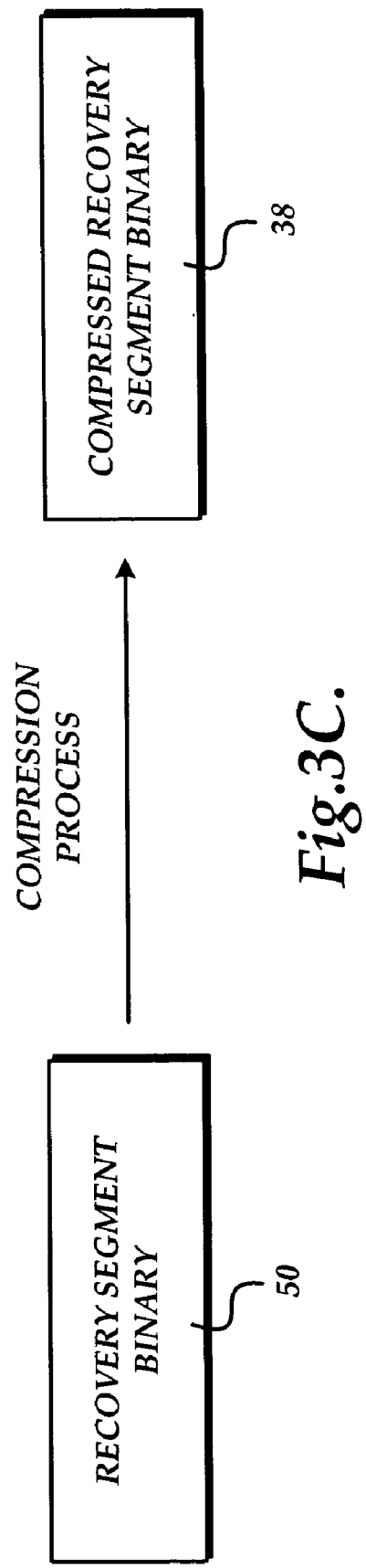

METHOD, SYSTEM, AND APPARATUS FOR UTILIZING COMPRESSED PROGRAM CODE IN THE BOOT BLOCK PORTION OF A COMPUTER BIOS

CROSS REFERENCE TO RELATED APPLICATIONS

This application claims the benefit of provisional U.S. Patent Application No. 60/447,085, filed Feb. 13, 2003, and entitled "Method, System, and Apparatus for Utilizing Compressed Code in the boot block Portion of A Computer Basic Input/Output System," the entire contents of which is expressly incorporated herein by reference.

BACKGROUND OF THE INVENTION

Many desktop and server computer systems utilize a basic input/output system ("BIOS") to control various aspects of the computer system. In particular, the BIOS is utilized to perform a power on self-test, to initialize the various hardware components within the computer system, to provide an interface between an operating system executing on the computer system and the hardware, and to perform various other functions.

In many computer systems, the BIOS is stored in an electrically erasable and programmable read only memory ("EEPROM") device, also referred to herein as a "flash memory device" or a "flash part." Because flash memory devices may be programmed while actually installed in a computer system, a computer BIOS stored in such a device may be upgraded without removing the flash part from the computer system. This is very convenient for both end users and system administrators.

Many flash memory devices are "sectored" devices that can update the program code stored in a portion of the device, called a "sector" or "block", without modifying the program code stored in the remainder of the device. Many such devices also support the use of a special block that includes a hardware protection mechanism. When engaged, the hardware protection mechanism prevents software from erasing the contents of the block. This hardware protected block, called the "boot block", is typically used to store a minimal amount of program code necessary for starting up the computer system. For instance, program code for discovering and initializing the random access memory ("RAM") devices within the computer system may be stored in the boot block. The remainder of the BIOS may be stored in a non-hardware protected region of the EEPROM.

Recovery program code may also be stored in the boot block for recovering the remainder of the BIOS should it become corrupted. Utilizing the recovery program code, the BIOS can recover itself from erasure or corruption of all of the other sectors in the flash part as long as the code residing in the boot block is intact. The recovery program code utilizes an image of the BIOS stored on a mass storage device to reprogram the contents of the EEPROM other than the boot block.

When a computer system utilizing such a BIOS is powered on, the central processing unit ("CPU") begins executing program code directly from the EEPROM to initialize the system RAM and to perform other functions. Because the CPU begins executing this code immediately upon powering up, this code must be stored in an uncompressed format ready for execution by the CPU. However, with the introduction of many new types of removable media drives and the increasing size of the BIOS program code, it has become necessary to support recovery from a variety of different media types. For instance, while recovery was initially supported from floppy disk only, it is now necessary to support recovery from floppy disk, CD-ROM, ZIP drives, LS-120 drives, the serial port, universal serial bus ("USB") devices, and other types of devices. In order to support recovery from each of these types of devices, a large quantity of program code must be available within the book block portion of a system BIOS.

Several solutions have been found for increasing the amount of storage space available within the hardware protected boot block portion of a computer BIOS. However, each of these solutions suffers from at least one serious drawback. The first solution is simply to utilize a larger capacity flash part. However, large capacity flash parts are considerably more expensive than smaller capacity flash parts, thereby increasing the cost to manufacture the computer system. With the ever increasing cost competition in the computer industry, this is not a viable option for most manufacturers.

A second solution involves removing the recovery program code from the boot block. However, if the BIOS becomes corrupted and the recovery program code is unavailable in the boot block, it may become impossible to recover the contents of the BIOS. This also is not a viable option for most manufacturers. Alternatively, some manufacturers have chosen to remove program code for recognizing and initializing certain types of memory devices from the boot block portion of the BIOS. However, a computer system configured in this way may also become unbootable should an unsupported memory device be installed in the system. This would be frustrating for the computer user and may result in additional technical support costs to the manufacturer.

It is with respect to these considerations and others that the present invention has been made.

SUMMARY OF THE INVENTION

In accordance with the present invention, the above and other problems are solved by methods and systems that utilize compressed code in the boot block portion of a computer BIOS that does not require the use of a larger capacity flash part and that does not require removing recovery program code from the boot block. By compressing the recovery program code and any other code contained within the boot block that is not absolutely necessary to start the operation of the computer, a larger amount of space can be made available for the recovery program code and other program code stored within the boot block.

In accordance with other aspects, the present invention relates to a computer program product readable by a computing system and encoding a computer program of instructions, such as an EEPROM. The computer program product includes a hardware protected region, such as a boot block, that is utilized to store a portion of a computer BIOS. The BIOS includes a compressed computer program for restoring at least a portion of the computer BIOS when uncompressed and executed. The computer program product also includes a non-hardware protected region that is utilized to store the remainder of the computer BIOS.

The hardware protected region may also include an uncompressed computer program that may be utilized to uncompress the compressed program stored in the hardware protected region. Moreover, the hardware protected region may also include an uncompressed computer program for detecting and initializing one or more memory devices within the computing system. When the computing system is powered on, this program is utilized to detect and initialize the random access memory devices, or other types of temporary storage memory devices, utilized within the computer system. The computer program for uncompressing the compressed portion of the program stored within the hardware protected region may then be executed to decompress the compressed portion of the program code stored within the hardware protected region. The decompressed computer code may be stored in the random access memory or other type of temporary storage memory device.

When executed, the uncompressed code may determine whether the BIOS utilized within the computer system has become corrupted or is otherwise invalid. In response to determining that the BIOS is invalid, the program may then recover the contents of the BIOS by replacing the BIOS with a copy of the BIOS stored on a mass storage device.

In accordance with other aspects of the invention, a method is provided for utilizing compressed program code stored in a hardware protected region of a memory device within a computing system. According to the method, a portion of a computer BIOS is stored within the hardware protected region. This portion includes a recovery computer program operative to restore all or a portion of the computer BIOS when uncompressed and executed. The recovery computer program is stored within the hardware protected portion in a compressed format.

Also stored within the hardware protected region is a decompression computer program that is capable of uncompressing a compressed computer program when executed. In particular, the decompression computer program is operative to uncompress the recovery computer program. The decompression computer program is stored within the hardware protected region in an uncompressed format.

Also stored within the hardware protected region is a memory initialization computer program for detecting and initializing one or more random access memory devices within the computing system. The memory initialization computer program is stored in an uncompressed format. Upon an initial program load of the computing system, the memory initialization computer program is executed to detect and initialize the memory devices within the computing system. The decompression computer program is then copied to a memory area provided by the one or more random access memory devices.

Once the decompression computer program has been copied to a memory area, the decompression computer program is executed to thereby decompress the recovery computer program. The recovery program is then executed in order to determine whether any portion of the computer BIOS, including the portion of the BIOS stored outside the hardware protected region, is invalid. If the recovery computer program determines that any portion of the computer BIOS is invalid, the recovery program is executed to restore the invalid portion of the computer BIOS. This may include, for instance, copying a new BIOS from an image file stored on a mass storage device to the non-volatile storage area in which the BIOS is stored.

If the recovery program determines that the BIOS is valid, the decompression computer program may be executed to decompress a portion of the BIOS stored in a non-hardware protected region to a memory area provided by the random access devices. The uncompressed portion of the BIOS is then executed from the memory area to thereby execute the actual BIOS, including the performance of a power on self-test.

In accordance with still other aspects, the present invention relates to a method of utilizing compressed program code stored in a hardware protected region of a memory device of a computing system. According to the method, a first executable computer program code segment is generated. The first executable computer program segment may include, for instance, recovery code for recovering the contents of a computer BIOS. The first executable computer program code segment is then compressed. The compressed data is then converted to a raw data format that may be included in an assembly language program, such as a standard byte definition format.

According to the method, a second executable computer program code segment is generated that is operative to uncompress the compressed first executable computer program code segment when executed. The second executable computer program segment is also converted to a raw data format that may be included in an assembly language program, such as standard byte definitions.

According to the method, a third executable computer program segment is also generated. The third executable computer program code segment includes the converted raw data for the first executable code segment and the converted raw data for the second executable program segment. In this manner, the compressed code for the first executable computer segment and the code for the second executable computer segment are embedded within the third program code segment. The third executable computer program code segment is then stored in the hardware protected region of a memory device.

When the third executable computer program code segment is executed, the second executable computer program code segment is copied from the third executable computer program code segment to a random memory access device of the computing system. The second executable computer program code segment is then executed to decompress the first executable computer program code segment from its location within the third executable program code segment to a memory area provided by the random access memory device.

The first executable program code segment is then executed from the memory area to determine whether a portion of the BIOS stored in the non-hardware protected region is valid. If the BIOS is valid, the second executable program code segment is executed to decompress a portion of the BIOS stored in the non-hardware protected region and to execute the uncompressed BIOS. If, however, the BIOS is invalid, the second executable program code segment is executed from the memory area to restore the portion of the BIOS stored in the non-hardware protected region.

According to various aspects of the invention, a computer readable media comprising computer executable instructions for performing the various methods provided herein are also provided. Additionally, a computer controlled apparatus capable of performing the various methods described herein are also provided.

These and various other features as well as advantages, which characterize the present invention, will be apparent from a reading of the following detailed description and a review of the associated drawings.

BRIEF DESCRIPTION OF THE DRAWINGS

FIGS. 3A–3E are block diagrams illustrating various aspects of the process of creating a boot block portion of a computer BIOS that includes compressed code according to one embodiment of the invention.

DETAILED DESCRIPTION OF THE INVENTION

As described briefly above, embodiments of the present invention provide methods and systems for utilizing compressed program code in the boot block portion of a computer BIOS. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
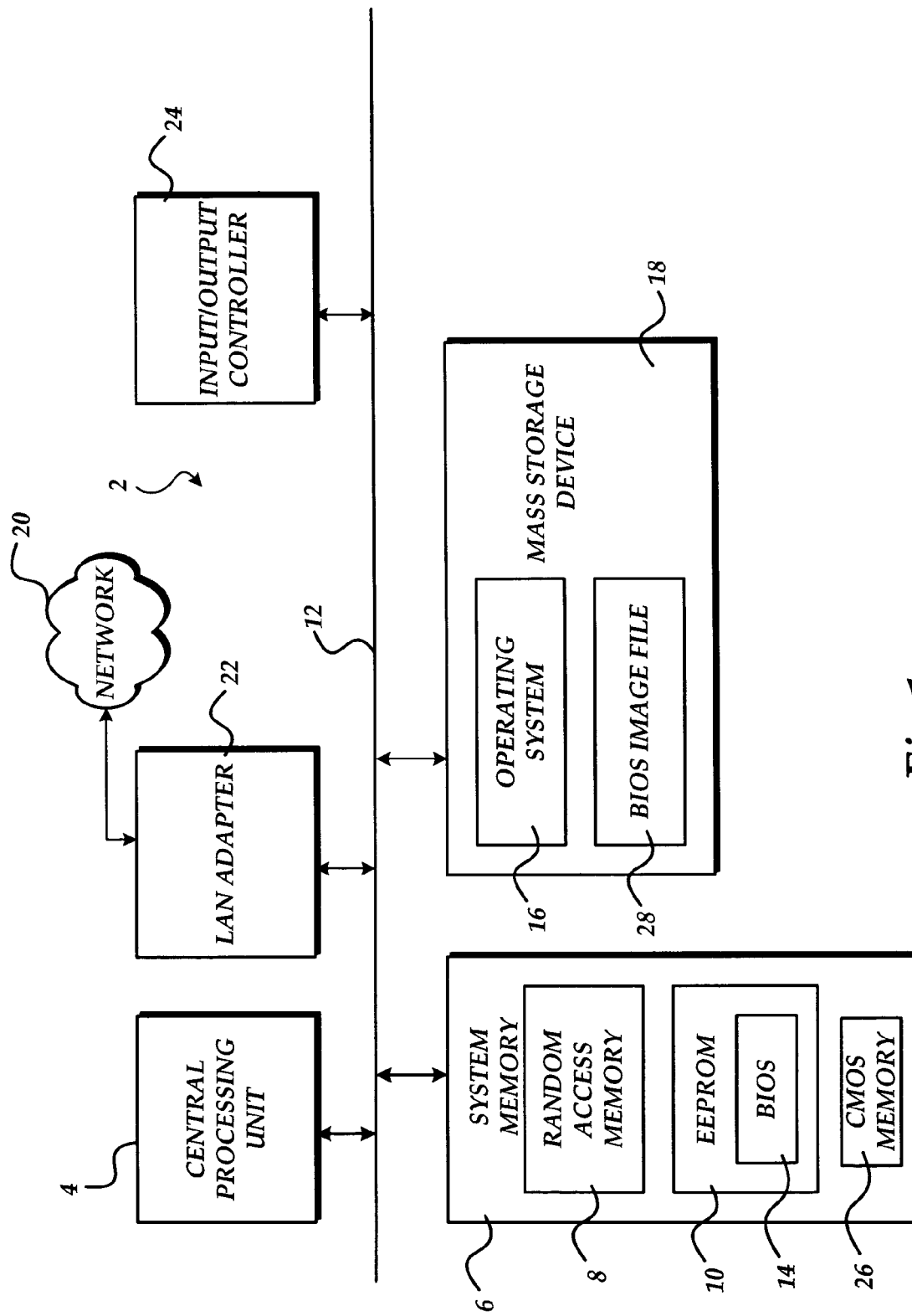
FIG. 1 is a block diagram illustrating a computer hardware and software architecture utilized in the various embodiments of the invention.

Referring now to the drawings, in which like numerals represent like elements through the several figures, aspects of the present invention and the illustrative operating environment will be described. FIG. 1 and the following discussion are intended to provide a brief, general description of a suitable computing environment in which the invention may be implemented. While the invention will be described in the general context of a BIOS that operates to control the operation of a personal or server computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computing system 2 utilized in the various embodiments of the invention will be described. The computer architecture shown in FIG. 1 illustrates a conventional desktop or server computer, including a CPU 4, a system memory 6, including a RAM 8, an EEPROM 10 and a CMOS memory 26, and a system bus 12 that couples the memory to the CPU 4. A BIOS 14 containing the basic routines that help to transfer information between elements within the computer, such as during startup, is stored in the EEPROM 10. The BIOS 14 is executed by the CPU 5 when the computer 2 is powered on. The BIOS 14 performs a number of functions at startup of the computer 2, including discovering and initializing the RAM 8, copying the contents of the BIOS 14 to the RAM 8, executing the BIOS 14 to perform a power on self-test ("POST") routine, and to pass control of the computer 2 to an operating system 16. Once the operating system 16 has been loaded, aspects of the BIOS 14 may be utilized to manage data flow between the operating system 16 and devices attached to the computer 2, such as a mass storage device 18, a video adapter, a keyboard, a mouse and a printer. The CMOS memory 26 is a battery-backed memory device that is used by the BIOS 14 to store setting information for the computer 2.

As known to those skilled in the art, the BIOS 14 is an integral part of the computer 2 and is typically shipped with the computer 2 from the manufacturer. The BIOS 14 is made accessible to the CPU on an EEPROM device 10. When the computer 2 is powered on, the CPU 4 passes control to the BIOS 14, which is always located at the same place in the memory architecture of the computer 2. By utilizing the BIOS 14, the operating system 16 and its applications are freed from having to understand exact details, such as hardware addresses, about input/output devices attached to the computer 2. As described in greater detail herein, in order to store the maximum amount of data on the EEPROM 10, portions of the BIOS may be stored in a compressed format. The compressed portions are decompressed prior to execution by the CPU 4.

The computing system 2 further includes a mass storage device 18 for storing an operating system 16, application programs, and other program modules. The mass storage device 18 is connected to the CPU 4 through a mass storage controller (not shown) connected to the bus 12. The mass storage device 18 and its associated computer-readable media, provide non-volatile storage for the computing system 2. Although the description of computer-readable media contained herein refers to a mass storage device, such as a hard disk or CD-ROM drive, it should be appreciated by those skilled in the art that computer-readable media can be any available media that can be accessed by the computing system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing system 2.

According to various embodiments of the invention, the computing system 2 may operate in a networked environment using logical connections to remote computers through a network 20, such as the Internet. The computing system 2 may connect to the network 20 through a network interface unit 22 connected to the bus 12. It should be appreciated that the network interface unit 22 may also be utilized to connect to other types of networks and remote computer systems. The computing system 2 may also include an input/output controller 24 for receiving and processing input from a number of other devices, including a keyboard, mouse, or electronic stylus (not shown in FIG. 1). Similarly, an input/output controller 24 may provide output to a display screen, a printer, or other type of output device.

As mentioned briefly above, a number of program modules and data files may be stored in the mass storage device 18 and RAM 8 of the computer 2, including an operating system 16 suitable for controlling the operation of a networked personal or server computer, such as the WINDOWS XP operating system from MICROSOFT CORPORATION of Redmond, Wash. The mass storage device 14 and RAM 9 may also store a BIOS image file 28. The BIOS image file 28 comprises a data file that may be utilized by recovery program code located within the BIOS 14 to restore the contents of the BIOS 14 in the event that it becomes corrupted or outdated. The recovery program code is stored within a special hardware protected region of the EEPROM 10, called the boot block, that cannot be erased by software. In this manner, the recovery program code is always available to restore the contents of the remainder of the BIOS 14, even if portions of the remainder of the BIOS 14 are inadvertently erased. In order to recover the contents of the BIOS 14, the recovery program code may copy the contents of the BIOS image file 28 to the EEPROM 10. Additional details regarding the contents of the boot block portion of the EEPROM 10 and the operation of the recovery program code will be provided in greater detail below.

Figure 2:
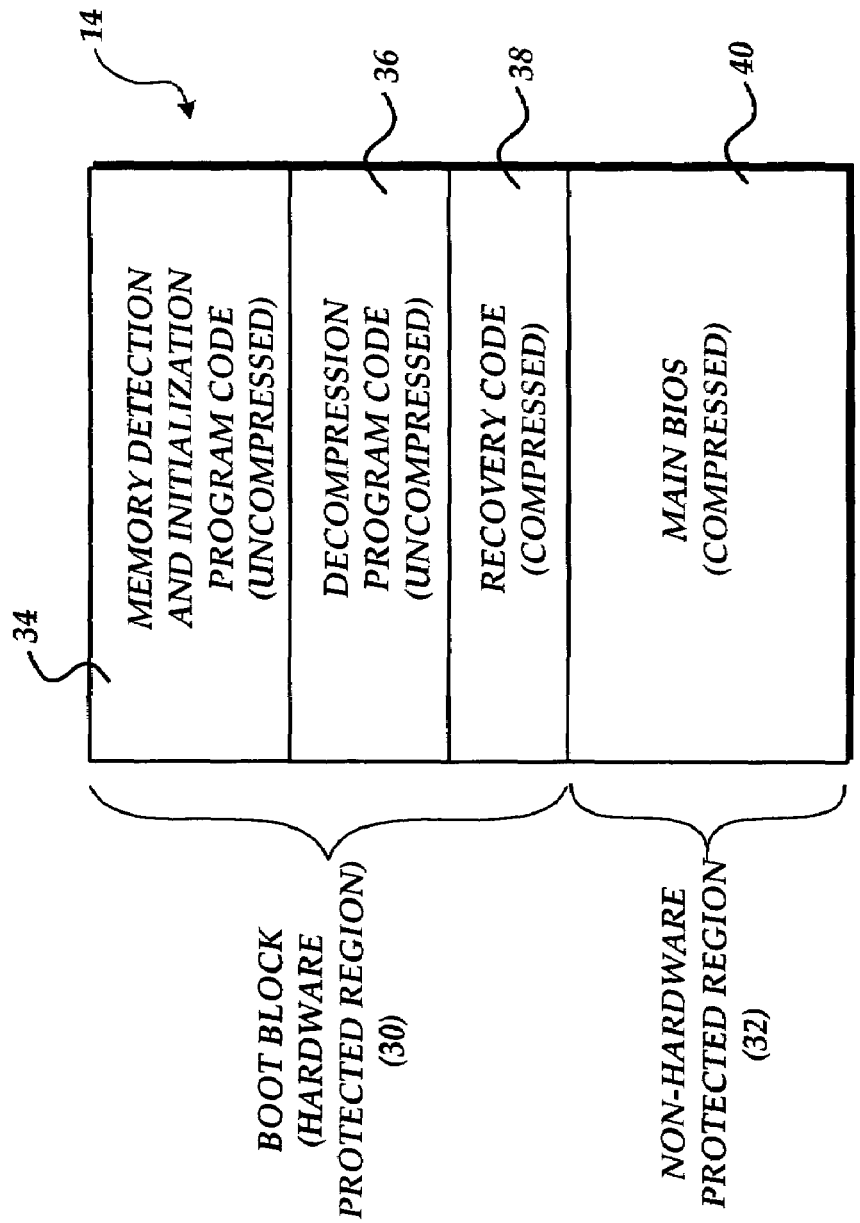
FIG. 2 is a block diagram illustrating the contents of a computer BIOS provided according to the various embodiments of the invention.

Referring now to FIG. 2, additional details regarding a BIOS 14 provided by the various embodiments of the invention will be described. As shown in FIG. 2, a BIOS 14 provided by the various embodiments of the invention may be stored within an EEPROM 10. As discussed briefly above, the EEPROM 10 may be divided into two distinct regions. In particular, a hardware protected region 30, also described herein as the boot block region, may be provided by the EEPROM 10. As know to those skilled in the art, the hardware protected region 30 compresses an area of the EEPROM 10 that cannot be modified by software executing on the computer 2 without the removal of a hardware lock. If the hardware lock is enabled, no software executing on the computer 2 can modify the contents of the hardware protected region 30.

Because the contents of the hardware protected region 30 cannot be modified, this area is utilized to store critical program code necessary for the operation of the computer 2. In particular, the hardware protected region 30 is utilized to store memory detection and initialization program code 34. The program code 34 is executed by the computer 2 when it is initially powered on and is utilized to detect and initialize the random access memory devices 8 within the computer 2. Because the memory detection initialization program code 10 is executed by the computer 2 immediately upon power up, the memory detection and initialization program code 10 must be stored in an uncompressed form.

Once the memory detection and initialization code 34 has detected and initialized the random access memory 8, compressed program code may be utilized by the computer 2. Accordingly, the hardware protected region 30 is also utilized to store decompression program code 36 in an uncompressed format. The decompression program code 36 compresses an executable computer program operative to decompress programs and data that have been compressed utilizing a compatible algorithm. Various algorithms for compressing and uncompressing data and programs are known to those skilled in the art.

When the computer 2 is powered on, the memory detection and initialization program code 34 may copy the decompression program code 36 to a location in the RAM 8. The decompression program code 36 may then be executed to decompress the recovery program code 38, which is also stored in the hardware protected region 30. The recovery program code 38 comprises program code necessary to determine whether the contents of the BIOS 14 are valid. Additionally, the recovery program 38 includes executable instructions for restoring the contents of the BIOS 14 if it is determined to be invalid. For instance, the recovery program code 38 may utilize a BIOS image file 28 stored on a mass storage device 18 to restore the contents of the BIOS 14. According to the various embodiments of the invention, the recovery program code 38 is stored within the hardware protected region 30 in a compressed format.

Once the memory detection and initialization program code 34 has completed discovering and initializing the RAM 8 within the computer 2, the decompression code 36 is copied to an area within the RAM 8. The decompression code 36 is then executed in order to decompress the compressed recovery code 38 from the hardware protected region 30. The decompressed recovery code 38 is then executed from the RAM 8 and is operative to determine whether the remainder of the BIOS 40, stored in the non-hardware protected region 32, is valid. The remainder of the BIOS 40 is stored within the non-hardware protected region 32 in a compressed format. The BIOS 40 includes code for performing all of the BIOS functions other than discovering and initializing the RAM 8, decompressing program code, and performing a BIOS recovery. Accordingly, if the recovery code 38 determines that the BIOS 40 is not corrupted, the recovery code 38 is operative to uncompress the remainder of the BIOS 40 for execution. However, if the recovery code 38 determines that the remainder of the BIOS 40 has been corrupted, the recovery code 38 is operative to restore the BIOS 40 from a BIOS image file 28 located on a mass storage device 18.

Referring now to FIGS. 3A–3E, a process will be described for creating the contents of the hardware protected region 30 described above with reference to FIG. 2. The process illustrated and described in conjunction with FIGS. 3A–3E embeds the decompression code 36 and recovery code 38 within a memory segment that includes the memory detection and initialization program code 34. By utilizing the process illustrated in FIGS. 3A–3E, compressed program code may be utilized inside of a single executable program code segment. It should be appreciated, however, that other methods for utilizing compressed program code within the book block portion of a computer BIOS may be utilized. For instance, a separate segment may be utilized to store compressed program code. Other methods may also be apparent to those skilled in the art.

Figure 3A:
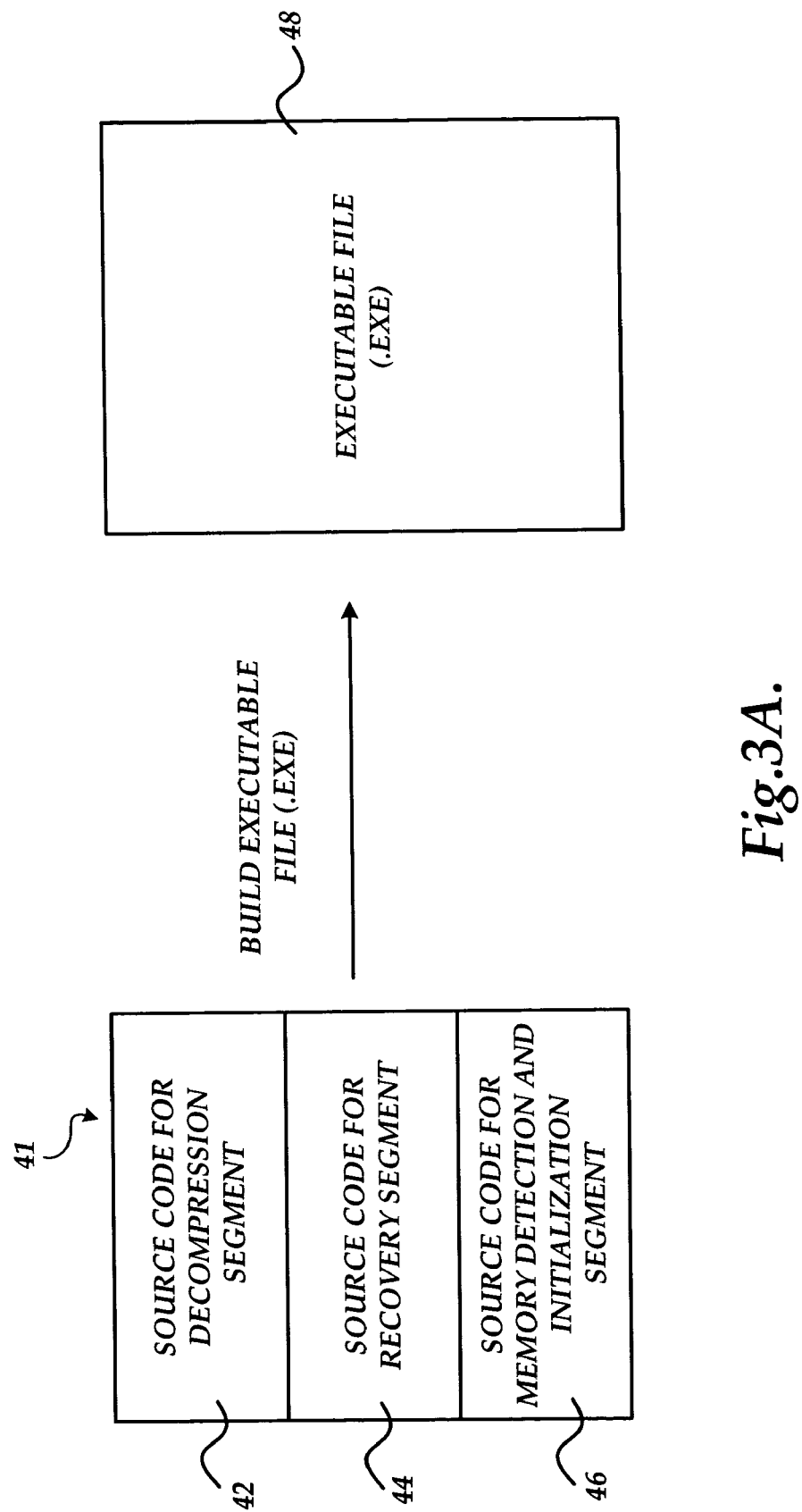

As shown in FIG. 3A, a source program file 41 includes source code 46 for the memory detection and initialization segment to be utilized within the BIOS 14. The source file 41 also includes source code 42 for the decompression segment and source code 44 for the recovery segment. The source file 41 is first built as a standard DOS EXE program during the build process. The executable file 48 contains all of the segments to be contained within the hardware protected region 30. Moreover, during the build of the executable file 48, there is no compressed code in the main code segment of the boot block. This first step, however, creates all of necessary intersegment references common in a multi-segment DOS EXE file.

Figure 3B:
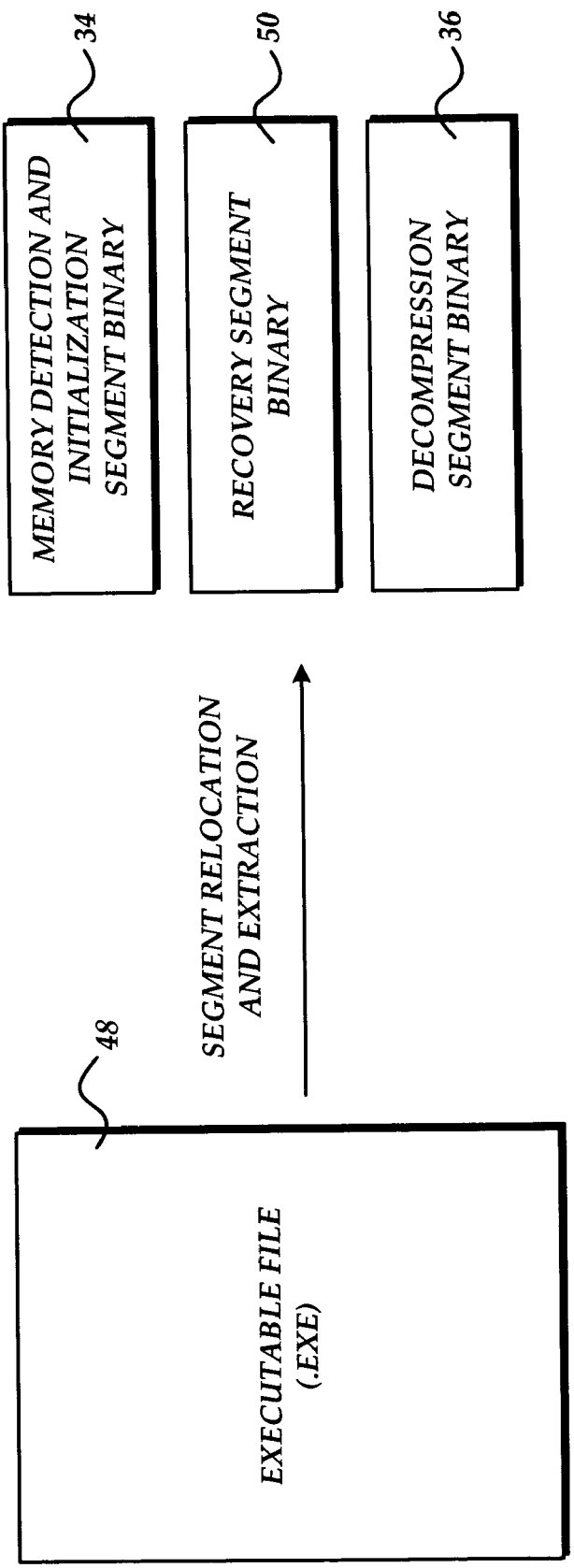

As shown in FIG. 3B, the executable file 48 is processed in a manner to perform segment relocation on the executable file 48 and to fix the segment execution location in the memory space of the computer 2. Additionally, output files are extracted from the original executable file 48 after performing the segment relocation. In particular, a binary file 34 for the memory detection and initialization segment, also called the main code segment herein, is generated. Additionally, a binary file for the recovery code segment is also created. The recovery segment code binary 50 includes a small header that indicates the destination address for the segment. As will be described in greater detail below, this file is compressed and embedded in the memory detection and initialization segment binary 34. The segment relocation and extraction process also produces a decompression segment binary 36. This file also includes a small header indicating the destination address for this segment. This file is embedded uncompressed into the memory detection and initialization segment binary 34.

Figure 3D:
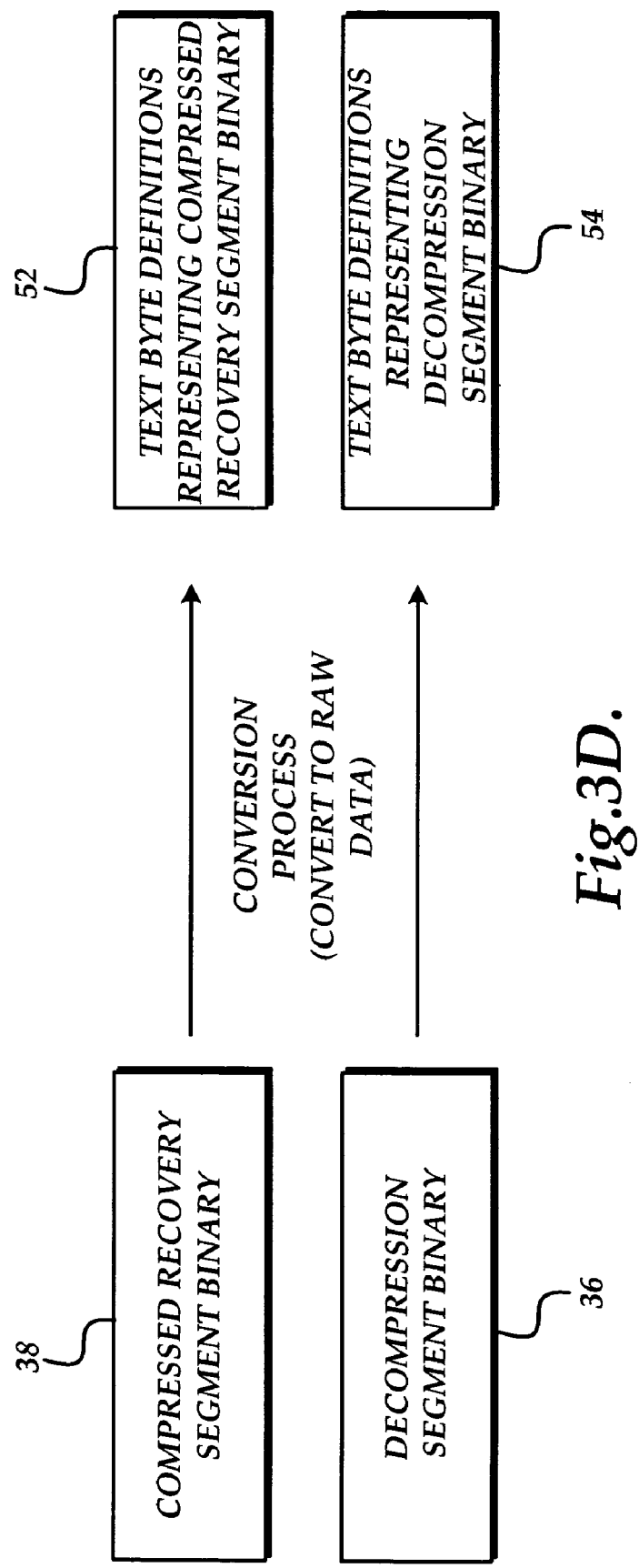

As shown in FIG. 3C, the recovery segment binary 50 is compressed to create a compressed recovery segment binary 38. By compressing the recovery segment binary 50, the size of the executable file is reduced. It should be appreciated that any suitable compression process may be utilized to compress the recovery segment binary 50. Once the compressed recovery segment binary 38 has been created, this file is converted to a raw data format. As shown in FIG. 3D, the compressed recovery segment binary 38 is converted to text byte definitions representing the compressed recovery code segment binary 52. These byte definitions may be contained in a standard text file and listed in a manner suitable for inclusion in the assembly process. For instance, a list of standard assembly language "DB" operands may be utilized to represent the data contained in the compressed recovery segment binary 38. A similar process is performed on the decompression segment binary 36 to convert the contents of the file 36 to text byte definitions representing the decompression segment binary 54.

Figure 3E:
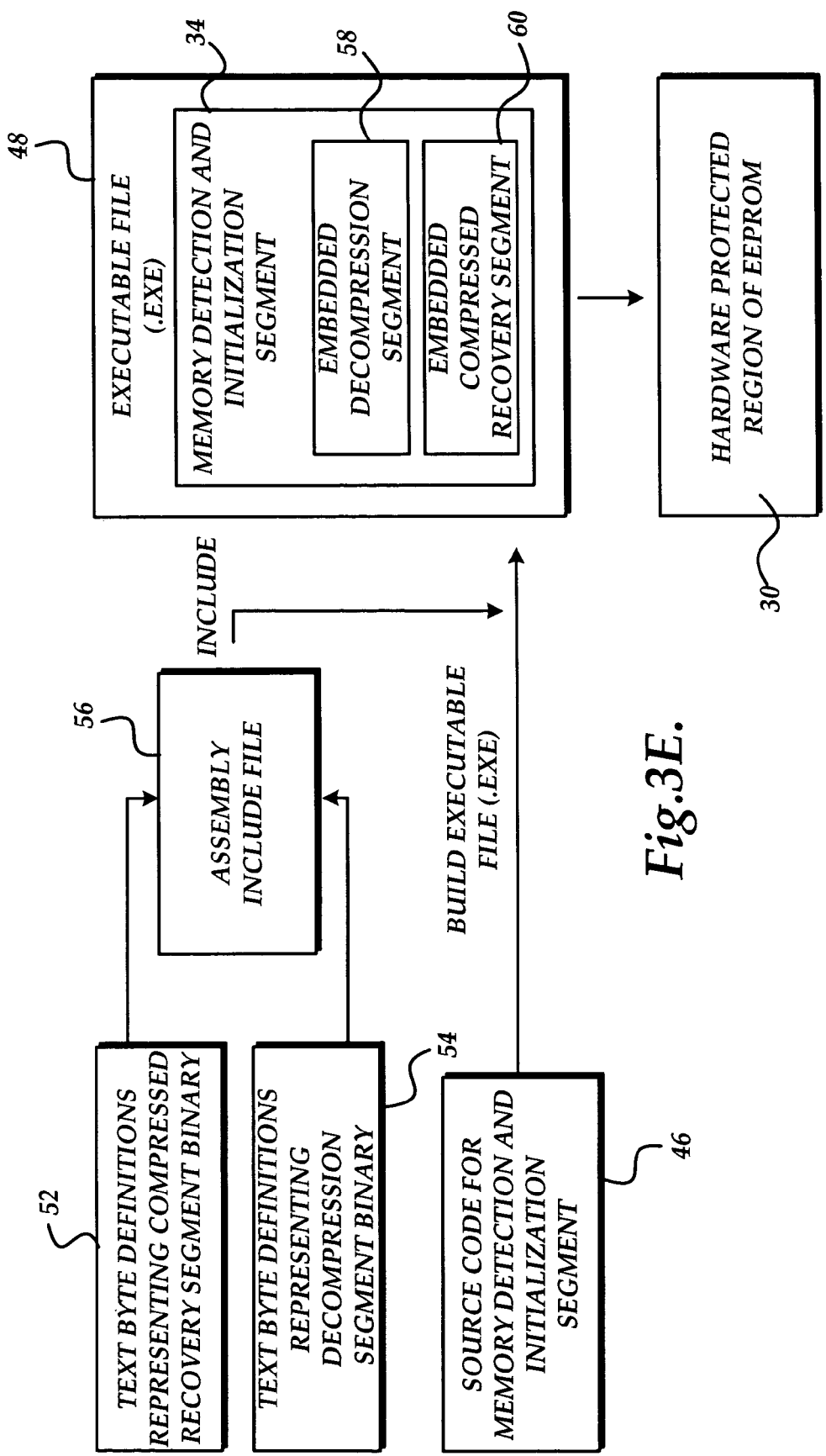

As shown in FIG. 3E, the text byte definitions for representing the compressed recovery segment binary 52 and the text byte definitions representing the decompression segment binary 54 are combined into an assembly include file 56. When the source for the memory detection and initialization code 46 is built, the assembly include file 56 is included in the build process. By including the assembly include file 56 in this manner, the executable file 48 that results includes the assembled code for the memory detection and initialization segment 34 and the byte definitions for the embedded decompression segment 58 and the embedded compressed recovery segment 60. Accordingly, the code for the decompression segment and the recovery segment is embedded within the memory detection and initialization segment 34. The contents of the executable file 48 are then stored in a hardware protected region 30 of the EEPROM 10. Additional details regarding the use of the memory detection and initialization segment 34, including the use of the embedded segments 58 and 60, will be provided in greater detail below with respect to FIGS. 4-6.

The logical operations of the various embodiments of the present invention are implemented (1) as a sequence of computer implemented acts or program modules running on a computer system and or (2) as interconnected machine logic circuits or circuit modules within the computer system. The implementation is a matter of choice dependant upon the performance requirements of the computer system implementing the invention. Accordingly, the logical operations making up the embodiments of the present invention described herein are referred to variously as operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
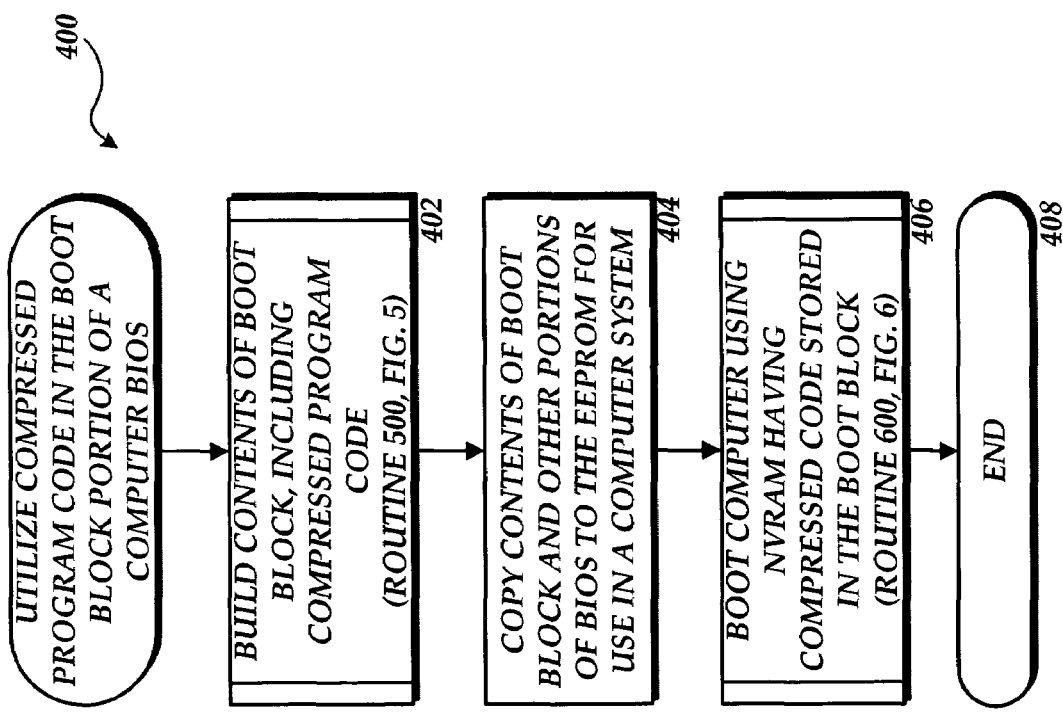
FIGS. 4–6 are flow diagrams illustrating a process for creating a boot block portion of a computer BIOS that utilizes compressed code therein.

Referring now to FIG. 4, a routine 400 will be described illustrating a process for utilizing compressed program code in the boot block portion of a computer BIOS. The routine 400 begins at operation 402, where the contents of the hardware protected region 30 are generated. A process for generating the contents of the hardware protected region 30 are discussed above with respect to FIGS. 3A–3E and described in more detail below with respect to FIG. 5. From operation 402, the routine 400 continues to operation 404, where the generated contents of the hardware protected region 30 and the remainder of the BIOS 40 are copied to an EEPROM 10 for use within the computer 2. The EEPROM 10 may then be installed within the computer 2.

Once the EEPROM 10 containing the compressed code within the hardware protected region 30 has been installed in the computer 2, an initial program load of the computer 2 may be performed. As discussed above, during the initial program load of the computer 2, the memory detection and initialization program code 14 detects and initializes the random access memory devices 8 within the computer 2 and executes the decompression program code 36 to decompress the recovery code 38. The recovery code 38 then determines whether the portion of the BIOS 14 contained in the non-hardware protected region 32 is valid. If the BIOS 14 is invalid, the recovery code 38 utilizes the contents of the BIOS image file 28 to restore the BIOS 14. If the contents of the BIOS 14 are valid, the recovery code 38 decompresses the BIOS to the random access memory 8 and executes the main BIOS. Additional details regarding this process will be described with reference to FIG. 6. From block 406, the routine 400 continues to operation 408, where it ends.

Figure 5:
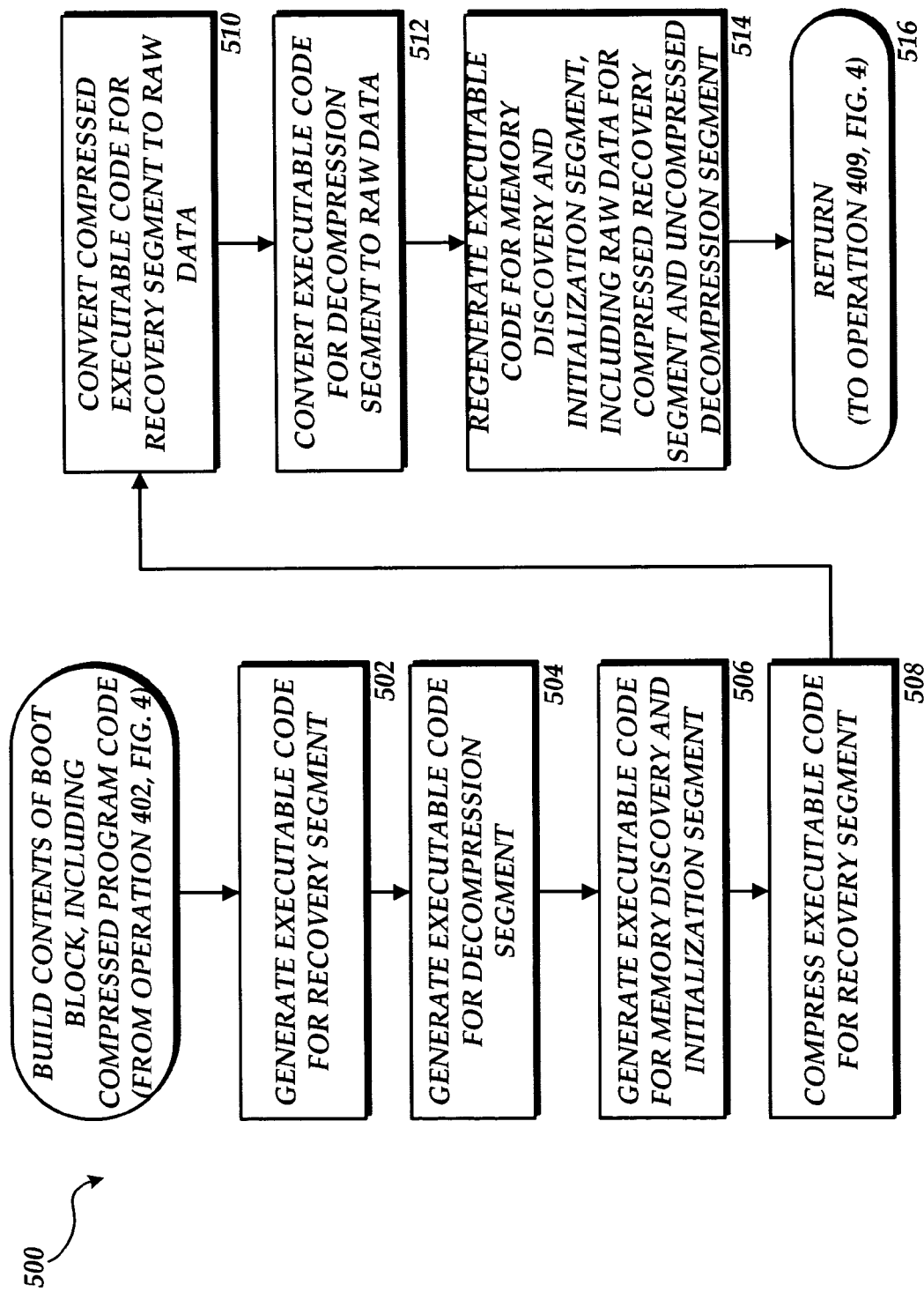

Turning to FIG. 5, an illustrative routine 500 will be described illustrating a process for building the contents of the hardware protected region 30. As discussed above, the contents include compressed code for recovering the contents of the BIOS 14 should the BIOS 14 become corrupted. The routine 500 begins at operation 502, where executable code for the recovery code segment is generated. The routine then continues to operation 504 where executable code for the decompression segment is generated. At operation 506, executable code for the memory discovery and initialization segment is generated. This process is illustrated above in FIG. 3A. Additionally, segment relocation and extraction is performed on the resulting executable files thereby creating separate executable binaries for the memory detection and initialization segment, the recovery segment, and the decompression segment.

At operation 508, the executable code for the recovery segment is compressed. As discussed, any suitable compression algorithm may be utilized to compress the recovery code. The routine 500 then continues to operation 510, where the compressed executable code for the recovery segment is converted to a raw data format. This may include, for instance, converting the binary data to a list of byte definitions for inclusion in an assembly language include file. At operation 512, the executable code for the decompression segment is converted to raw data format in a similar manner.

At operation 514, the executable code for the memory discovery and initialization segment is regenerated. In particular, during the assembly of the executable code for the memory discussion discovery and initialization segment, the raw data for the compressed recovery segment and the raw data for the uncompressed decompression segment are included in the assembly. In this manner, the raw data representing the compressed executable code for the recovery segment and the raw data for the executable decompression segment are included in the executable code for the memory discovery and initialization segment. From operation 514, the routine 500 continues to operation 516, where it returns to operation 404, discussed above with reference to FIG. 4.

Figure 6:
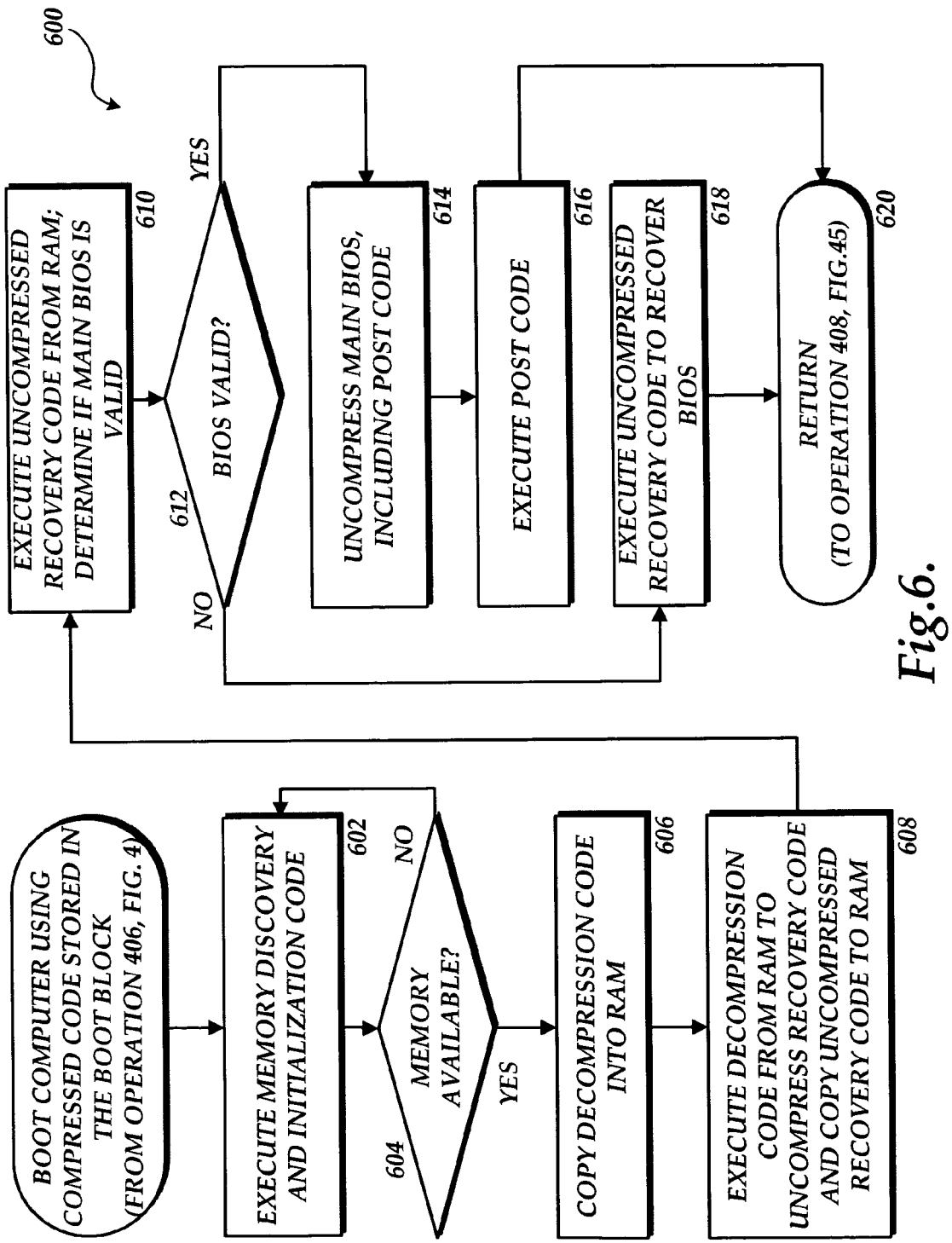

Referring now to FIG. 6, an illustrative routine 600 will be described for performing an initial program load of the computer 2 utilizing compressed code stored in the hardware protected region 30 of the EEPROM 10. The routine 600 begins as operation 602, where the memory detection and initialization program 34 is executed. As discussed above, the memory detection and initialization program code 34 detects random access memory devices 8 installed within the computer 2 and initializes these devices. The routine 600 then continues from operation 602 to operation 604 where a determination is made as to whether the random access memory has been made available. If the random access memory is not available, the routine 600 branches back to operation 602. If the RAM memory is available, the routine 600 continues to operation 606, where the decompression program code 36 is copied to an area within the RAM 8. The decompression code 36 is then executed from the RAM 8 at operation 608 to thereby uncompress the compressed recovery code 38 from its location within the hardware protected region 30. From operation 608, the routine 600 continues to operation 610.

At operation 610, the uncompressed recovery code is executed from RAM 8. During the execution of the recovery code 38, a determination is made as to whether the portion of the BIOS stored in the non-hardware protected region 32 is valid. This may be performed, for instance, by performing a checksum operation on the contents of the main BIOS 40.

If, at block 612, it is determined that the BIOS 14 is valid, the routine 600 continues to operation 614. At operation 614, the recovery code 38 decompresses the portion of the BIOS 14 stored in the non-hardware protected region 32 to RAM 8. The BIOS is then executed from the RAM 8 to, for instance, execute the power on self-test code. This occurs at operation 616. From operation 616, the routine 600 continues to operations 620, where it returns to operation 408, discussed above with respect to FIG. 4.

If, however, at operation 612, the recovery code 38 determines that the BIOS 14 is invalid, the routine 600 branches to operation 618. At operation 618, the recovery program code 38 is utilized to recover the contents of the BIOS 14. In particular, a BIOS image file 28 stored on a mass storage device 18 where a network location may be utilized to reprogram the contents of the EEPROM 10. It should be appreciated that the hardware protected region 30 is locked in that only the non-hardware protected region 32 may be updated by the recovery code 38. Once the contents of the EEPROM 10 have been updated by the recovery code, the routine 600 continues to operation 620. At operation 620, the routine 600 returns back to block 408, discussed above with respect to the FIG. 4.

Based on the foregoing, it should be appreciated that the various embodiments of the invention provide methods and systems for utilizing compressed program code in the boot block portion of a computer BIOS. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer program product readable by a computing system and encoding a computer program of instructions, the computer program product comprising:
    a hardware protected region storing a portion of a computer basic/input/output system comprising:
        a compressed computer program operative to restore a portion of the computer basic input/output system when uncompressed and executed, and
        a first uncompressed computer program operative to uncompress the compressed computer program; and
    a non-protected region storing the remainder of the computer basic input/output system.

2. The computer program product of claim 1, wherein the uncompressed computer program is operative to uncompress the compressed computer program in response to determining that a portion of the basic input/output system stored within the non-protected region is invalid.

3. The computer program product of claim 2, wherein the portion of the computer basic input/output system stored within the hardware protected region further comprises:
    a second uncompressed computer program for detecting and initializing one or more random access memory devices within the computing system.

4. The computer program product of claim 3, wherein restoring the portion of the computer basic input/output system stored in the non-protected region comprises replacing the portion of the computer basic input/output system stored in the non-protected region with a computer basic input/output system stored on a mass storage device.

5. A method for utilizing compressed program code stored in a hardware protected region of a memory device of a computing system, the method comprising:
    storing within the hardware protected region a portion of a computer basic input/output system comprising a recovery computer program operative to restore a portion of the computer basic input/output system when uncompressed and executed, the recovery computer program being stored in a compressed format;
    storing within the hardware protected region an decompression computer program operative to uncompress a compressed computer program when executed, the decompression computer program being stored in an uncompressed format; and
    storing within the hardware protected region a memory initialization computer program for detecting and initializing one or more random access memory devices within the computing system, the memory initialization computer program stored in an uncompressed format.

6. The method of claim 5, further comprising:
    upon an initial program load of the computing system, executing the memory initialization computer program to detect and initialize one or more random access memory devices within the computing system; and
    copying the decompression computer program to a memory area provided by the one or more random access memory devices.

7. The method of claim 6, further comprising:
    executing the decompression computer program to decompress the recovery computer program to a memory area provided by the one or more random access memory devices.

8. The method of claim 7, further comprising:
    storing within a non-hardware protected region of the memory device a second portion of the computer basic input/output system, the second portion of the computer basic input/output system stored in a compressed format; and executing the recovery program from the memory area to determine whether the portion of the computer basic input/output system stored in the non-hardware protected region of the memory device is valid.

9. The method of claim 8, further comprising:

in response to determining that the portion of the computer basic input/output system stored in the non-hardware protected region of the memory device is valid, executing the decompression computer program to decompress the portion of the basic input/output system stored in the non-hardware protected region to a memory area provided by the one or more random access memory devices; and executing the uncompressed portion of the basic input/output system stored in the non-hardware protected region from the memory area.

10. The method of claim 8, further comprising:

in response to determining that the portion of the computer basic input/output system stored in the non-hardware protected region of the memory device is invalid, executing the recovery computer program from the memory area to restore the portion of the computer basic input/output system stored in the non-hardware protected region.

11. A computer storage media comprising computer-executable instructions which, when executed by a computer, cause the computer to perform the method of claim 5.

12. A computer-controlled apparatus operative to perform the method of claim 5.

13. A method for utilizing compressed program code stored in a hardware protected region of a memory device of a computing system, the method comprising:

generating a first executable computer program code segment, the first executable computer program code segment operative to determine whether a portion of a computer basic input/output system stored in a non-hardware protected region of the memory device is valid;

compressing the first executable computer program code segment;

converting the compressed first executable computer program code segment to a raw data format;

generating a second executable computer program code segment, the second executable program code segment operative to uncompress the compressed first executable computer program code segment;

converting the second executable computer program code segment to a raw data format;

generating a third executable computer program code segment, the third executable computer program code segment including the converted raw data for the first executable code segment and the converted raw data for the second executable program code segment; and storing the third executable computer program code segment in the hardware protected region of the memory device.

14. The method of claim 13, further comprising:

executing the third executable computer program code segment from the memory device, including copying the second executable computer program segment from the third executable computer program code segment to one or more random access memory devices of the computing system; and executing the second executable computer program segment to decompress the first executable computer program code segment from the third executable program code segment to a memory area provided by the one or more random access memory devices.

15. The method of claim 14, further comprising:

executing the first executable program code segment from the memory area to determine whether the portion of the computer basic input/output system stored in the non-hardware protected region of the memory device is valid.

16. The method of claim 15, further comprising:

in response to determining that the portion of the computer basic input/output system stored in the non-hardware protected region of the memory device is valid, executing the second executable program code segment to decompress the portion of the basic input/output system stored in the non-hardware protected region to a memory area provided by the one or more random access memory devices; and executing the uncompressed portion of the basic input/output system stored in the non-hardware protected region from the memory area.

17. The method of claim 15, further comprising:

in response to determining that the portion of the computer basic input/output system stored in the non-hardware protected region of the memory device is invalid, executing the second executable program code segment from the memory area to restore the portion of the computer basic input/output system stored in the non-hardware protected region.

18. The method of claim 17, further comprising:

executing the second executable program code segment to decompress the restored portion of the basic input/output system stored in the non-hardware protected region to a memory area provided by the one or more random access memory devices; and executing the uncompressed portion of the basic input/output system stored in the non-hardware protected region from the memory area.

19. A computer storage media comprising computer-executable instructions which, when executed by a computer, cause the computer to perform the method of claim 13.

20. A computer-controlled apparatus operative to perform the method of claim 13.

* * * * *